(12) United States Patent
Dreyer et al.

(10) Patent No.: US 10,102,087 B2
(45) Date of Patent: Oct. 16, 2018

(54) METHODS, SYSTEMS, AND COMPUTER READABLE MEDIA FOR DETECTING AND MANAGING SUSPECT SUBSCRIBER BINDINGS

(71) Applicant: Oracle International Corporation, Redwood Shores, CA (US)

(72) Inventors: Stephen Edward Dreyer, Cary, NC (US); David Michael Sprague, Raleigh, NC (US); John Scott Gilmore, Cary, NC (US); Sridhar Karuturi, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 15/048,410

(22) Filed: Feb. 19, 2016

(65) Prior Publication Data
US 2017/0242765 A1   Aug. 24, 2017

(51) Int. Cl.
*G06F 11/00* (2006.01)
*G06F 11/20* (2006.01)
(Continued)

(52) U.S. Cl.
CPC ...... *G06F 11/2033* (2013.01); *G06F 11/2002* (2013.01); *H04M 15/66* (2013.01); *H04L 12/1407* (2013.01)

(58) Field of Classification Search
CPC ............. G06F 11/2002; G06F 11/2005; G06F 11/2023; G06F 11/2028; G06F 11/2033;
(Continued)

(56) References Cited

U.S. PATENT DOCUMENTS 8,615,237 B2   12/2013   Baniel et al.
8,737,304 B2   5/2014   Karuturi et al.
(Continued)

FOREIGN PATENT DOCUMENTS

CN   101277541 A   10/2008
CN   102239481 A   11/2011
(Continued)

OTHER PUBLICATIONS

"3GPP TR 29.816 v10.0.0 (Sep. 2010) Technical Report, 3rd Generation Partnership Project; Technical Specification Group Core Network Terminals; Study on PCRF failure and restoration (Release 10)", 2010, 3GPP. (Year: 2010).*
(Continued)

*Primary Examiner* — Gabriel Chu
(74) *Attorney, Agent, or Firm* — Jenkins, Wilson, Taylor & Hunt, P.A.

(57) ABSTRACT

Methods, systems, and computer readable media for managing suspect subscriber bindings. In some examples, a method is performed by a Diameter signaling router (DSR) for a telecommunications network. The method includes binding a subscriber to a first policy and charging rules function (PCRF) server selected from a plurality of PCRF servers for the telecommunications network. The method includes determining that one or more messages destined to the first PCRF server have failed according to one or more user-configurable rules defining failure. The method includes tearing down the binding between the subscriber and the first PCRF server.

19 Claims, 14 Drawing Sheets

(51) Int. Cl.
*H04M 15/00* (2006.01)
*H04L 12/14* (2006.01)

(58) Field of Classification Search
CPC ............. H04L 41/0654; H04L 67/1006; H04L 67/1034; H04L 69/40; H04L 12/1407; H04L 63/0892; H04W 76/028; H04M 15/66

See application file for complete search history.

(56) References Cited

U.S. PATENT DOCUMENTS

| | | | |
|---|---|---|---|
| 8,825,060 B2 | 9/2014 | McCann et al. | |
| 8,942,747 B2 | 1/2015 | Marsico | |
| 9,215,133 B2 | 12/2015 | Baniel et al. | |
| 9,830,214 B1* | 11/2017 | McGinn | G06F 11/079 |
| 2004/0098612 A1 | 5/2004 | Lee et al. | |
| 2007/0242637 A1 | 10/2007 | Dynarski et al. | |
| 2009/0080440 A1* | 3/2009 | Balyan | H04L 67/1008 370/400 |
| 2009/0305684 A1 | 12/2009 | Jones et al. | |
| 2010/0284336 A1* | 11/2010 | Rui | H04L 12/14 370/328 |
| 2010/0299451 A1 | 11/2010 | Yigang et al. | |
| 2010/0311392 A1 | 12/2010 | Stenfelt et al. | |
| 2011/0040845 A1 | 2/2011 | Cai et al. | |
| 2011/0302289 A1* | 12/2011 | Shaikh | H04L 29/12216 709/223 |
| 2012/0072585 A1* | 3/2012 | Yang | H04L 69/40 709/224 |
| 2012/0131639 A1* | 5/2012 | Alex | H04L 63/0892 726/3 |
| 2012/0202550 A1* | 8/2012 | Marsico | H04W 8/08 455/515 |
| 2013/0003529 A1* | 1/2013 | Lopez Nieto | G06F 11/2097 370/221 |
| 2013/0036215 A1* | 2/2013 | Kupinsky | H04L 41/0893 709/223 |
| 2013/0339783 A1* | 12/2013 | Fernandez Alonso | H04L 12/1407 714/4.11 |
| 2014/0064183 A1* | 3/2014 | Mann | H04W 76/028 370/328 |
| 2015/0055446 A1* | 2/2015 | Avula | H04W 76/028 370/216 |
| 2015/0236863 A1* | 8/2015 | Castro Castro | H04L 12/1407 370/259 |
| 2015/0237669 A1* | 8/2015 | Abou-Assali | H04W 76/028 370/216 |

FOREIGN PATENT DOCUMENTS

| | | |
|---|---|---|
| CN | 103477661 B | 10/2016 |
| EP | 2 220 841 B1 | 9/2011 |
| JP | H10-98470 A | 4/1998 |
| JP | H11-224219 A | 8/1999 |
| JP | 2004-242326 A | 8/2004 |
| JP | 4041038 B2 | 1/2008 |
| JP | 5938052 B2 | 6/2016 |
| WO | WO 2012/118967 A1 | 9/2012 |

OTHER PUBLICATIONS

"3GPP TS 23.203 v11.7.0 (Sep. 2012) Technical Specification, 3rd Generation Partnership project; Technical Specification Group Services and System Aspects; Policy and charging control architecture (Release 11)", 2012, 3GPP. (Year: 2012).*

Notification of the First Office Action for Chinese Application No. 201280018297.3 (dated Jan. 15, 2016).

Extended European Search Report for European Application No. 12751783.7 (dated Jul. 22, 2014).

Notice of Allowance for U.S. Appl. No. 13/409,949 (dated Apr. 24, 2014).

Notice of Allowance and Applicant Initiated Interview Summary for U.S. Appl. No. 13/409,949 (dated Jan. 14, 2014).

Final Office Action for U.S. Appl. No. 13/409,949 (dated Sep. 19, 2013).

Communication of European publication number and information on the application of Article 67(3) EPC for European Application No. 12751783.7 (dated Dec. 11, 2013).

Non-Final Office Action for U.S. Appl. No. 13/409,949 (dated Feb. 15, 2013).

Fajardo et al., "Diameter Base Product," RFC 6733, pp. 1-152 (Oct. 2012).

Notification of Transmittal of the International Search Report and the Written Opinion of the International Searching Authority, or the Declaration for International Patent Application No. PCT/US2012/027281 (dated Jun. 15, 2012).

"Multi-Protocol Routing Agent User's Guide," 910-6404-001 revision A. Policy Management, Tekelec, pp. 1-70 (Jun. 2012).

Communication pursuant to Article 94(3) EPC for European Application No. 12 751 783.7 (dated Mar. 15, 2017).

Letter Regarding Notice of Grant for Chinese Patent Application No. ZL201280018297.3 (dated Jul. 4, 2016).

Letter Regarding Official Notice of Grant for Japanese Patent Application No. 2013-556860 (dated Apr. 26, 2016).

Calhoun et al., "Diameter Network Access Server Application," RFC 4005, pp. 1-85 (Aug. 2005).

* cited by examiner

210 ↘

Inserting a new Suspect Binding Removal Rule

| Field | Value | |
|---|---|---|
| Rule Name | [_____] * | ⟵ 212 |
| Application Name | - Select - ▼ * | ⟵ 214 |
| Command Code | - Select - ▼ * | ⟵ 216 |
| Error Scenario Category | - Select - ▼ * | ⟵ 218 |
| Result Code | [_____] | ⟵ 220 |
| Vendor ID | [_____] | ⟵ 222 |
| Remove Suspect Binding Immediately | ☐ | ⟵ 224 |
| Comments | [_____] | ⟵ 226 |

FIG. 2B

METHODS, SYSTEMS, AND COMPUTER READABLE MEDIA FOR DETECTING AND MANAGING SUSPECT SUBSCRIBER BINDINGS

TECHNICAL FIELD

The subject matter described herein relates generally to managing subscriber bindings. More particularly, the subject matter described herein relates to methods, systems, and computer readable media for detecting and managing suspect subscriber bindings.

BACKGROUND

For efficiency and cost reduction, some telecommunications providers bind subscribers to specific policy and charging rules function (PCRF) servers selected from a pool of PCRF servers for the telecommunications network, e.g., a long-term evolution (LTE) network. The PCRF is configured to make and manage policy decisions for the bound subscribers, so it can be more efficient in terms of computing and network resources for a subscriber to always use the same PCRF server. By binding subscribers to specific PCRF servers, different PCRF servers do not have to retrieve and maintain the data for subscribers bound to other PCRF servers. However, if a PCRF server fails, a subscriber may lose service as they can no longer access the needed policy data from the failed PCRF server.

Accordingly, in light of these difficulties, there exists a need for methods, systems, and computer readable media for detecting and managing suspect subscriber bindings, so that subscribers can re-bind to a functioning PCRF server after a failure and reacquire service.

SUMMARY

The subject matter described herein relates to methods, systems, and computer readable media for detecting and managing suspect subscriber bindings. A Diameter Signaling Router (DSR) is configured to allow a network service provider to configure rules for detecting suspect bindings based on, e.g., different types of Diameter signaling. These rules enable the DSR to immediately remove suspect bindings or to remove bindings after, e.g., a configurable number of failed messages.

In some examples, a method for detecting and managing suspect bindings is performed by a DSR for a telecommunications network. The method includes binding a subscriber to a first PCRF server selected from a plurality of PCRF servers for the telecommunications network. The method includes determining that one or more messages destined to the first PCRF server have failed according to one or more user-configurable rules defining failure. The method includes tearing down the binding between the subscriber and the first PCRF server.

In some examples, binding the subscriber to the first PCRF server includes storing an association between one or more subscriber identifiers for the subscriber and the first PCRF in a subscription binding repository (SBR), causing all policy Diameter messaging for the subscriber to be routed to the first PCRF server. In some examples, the method includes providing, to a configuration platform, a graphical user interface (GUI) configured to receive the user-configurable rules defining failure from a user.

In some examples, tearing down the binding between the subscriber and the first PCRF server includes notifying one or more policy and charging enforcement functions (PCEFs) serving the subscriber that the DSR is tearing down the binding between the subscriber and the first PCRF server. In some examples, tearing down the binding between the subscriber and the first PCRF server includes deleting one or more alternate key bindings for the subscriber.

In some examples, binding the subscriber to the first PCRF server includes using the binding from the subscriber to the first PCRF server for a session with an AF on a Rx interface. In some examples, binding the subscriber to the first PCRF server includes binding the subscriber to the first PCRF server for a session with a PCEF on a Gx interface.

In some examples, determining that one or more messages destined to the first PCRF server have failed includes comparing one or more fields in a failure response from an attempt to route to the first PCRF server with a vendor-ID rule of the one or more user-configurable rules and matching a vendor identifier for a vendor of the first PCRF server to the vendor-ID rule of the one or more user-configurable rules. In some examples, determining that one or more messages destined to the first PCRF server have failed includes counting a number of unsuccessful attempts to route a message to the first PCRF server and determining that the number of unsuccessful attempts exceeds a user-configurable threshold. In some examples, determining that one or more messages destined to the first PCRF server have failed includes ignoring a suspect binding event in response to determining that the suspect binding event was received before a user-configurable suspect binding removal events interval had passed since a previous suspect binding removal event that was not ignored.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by one or more processors of a computer cause the computer to perform operations.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIGS. 2A-D illustrate an example graphical user interface (GUI) for providing user-configurable rules defining failure of messages to a PCRF server;

DETAILED DESCRIPTION

Figure 1:
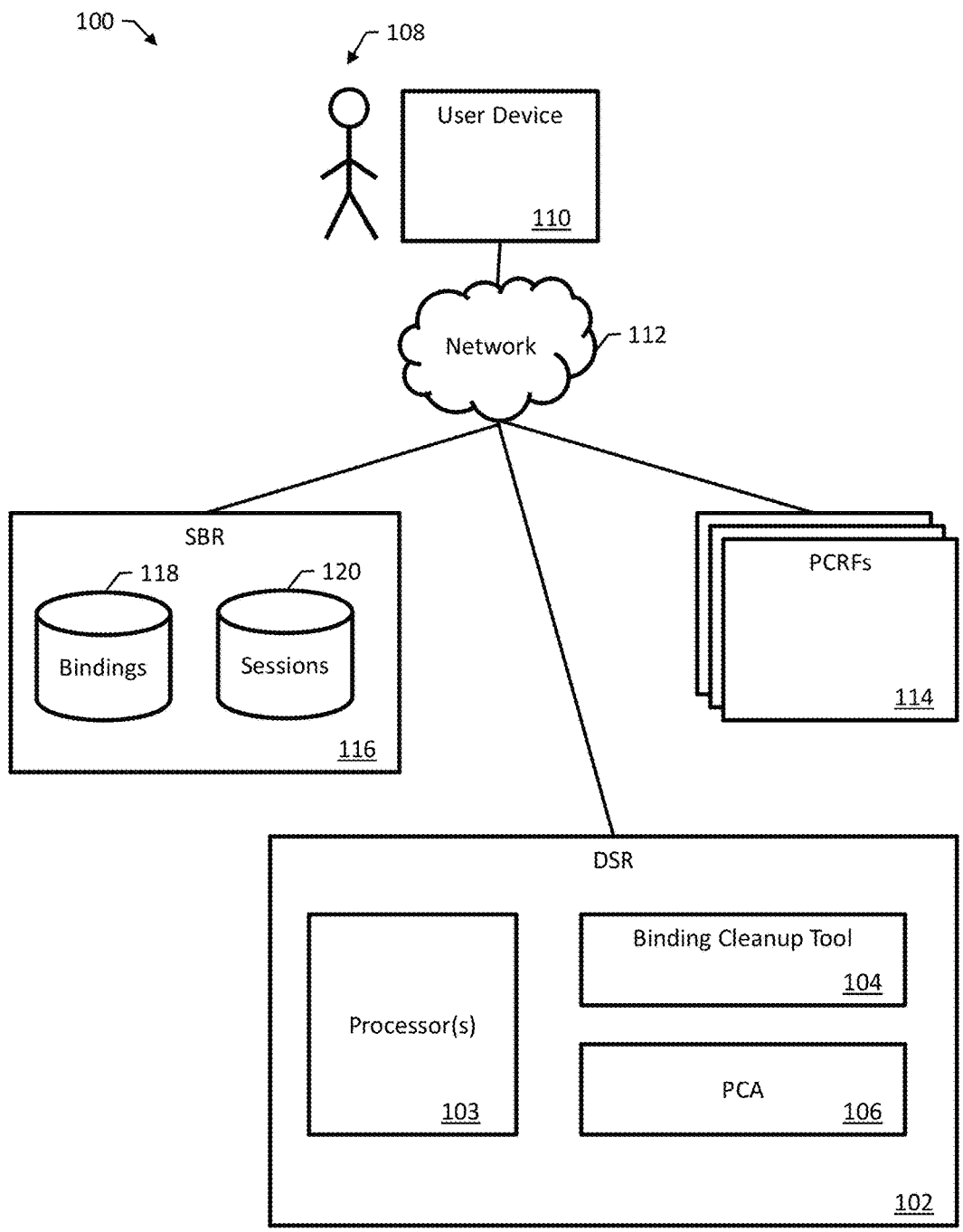
FIG. 1 is a block diagram of an example telecommunications network that includes a Diameter signaling router (DSR) configured to implement a binding cleanup tool 104 and a policy and charging application (PCA)

FIG. 1 is a block diagram of an example telecommunications network 100 that includes a Diameter signaling router (DSR) 102 configured to implement a binding cleanup tool 104 and a policy and charging application (PCA) 106. DSR 102 can be a system of one or more computers configured, by virtue of appropriate programming, to implement various functions including at least binding cleanup tool 104 and PCA 106. DSR 102 may include at least one processor 103 for implementing binding cleanup tool 104 and/or PCA 106.

Telecommunications network 100 includes a least one subscriber 108 accessing telecommunications network 100 using a user device 110 communicating with DSR 102 over a data communications network 112. Data communications network 112 can be a combination of networks, e.g., a radio access network coupled to a core network for carrying signaling messages for the telecommunications network 100.

User device 110 can include one or more computers, one or more computer readable mediums storing executable instructions for the computers, and input/output devices such as keyboards, display screens, touchpads, or other types of records or data. For example, user device 110 can be a tablet or mobile phone.

In operation, PCA 106 creates bindings between subscribers and PCRF servers selected from a pool of PCRF servers 114. PCA 106 then routes all policy messages for a given subscriber to the PCRF server that currently hosts that subscriber's policy rules. PCA 106 can perform other functions such as topology hiding to hide network topology information, such as the number and identities of PCRF servers 114 from untrusted external networks.

A PCRF is a system of one or more computers configured, by virtue of appropriate programming, as part of a 3rd Generation Partnership Project (3GPP) policy charging control (PCC) architecture. The elements of the PCC provide access, resource, and quality-of-service (QoS) control. The PCRF is implemented on pool of PCRF servers 114, and the servers are configured, by virtue of appropriate programming, to operate as a distributed computing system.

In operation, the PCRF servers 114 function in real-time or near real-time to determine policy rules in a telecommunication network. The PCRF servers 114 can, in some cases, operate at the network core and access user information and other specialized functions in a centralized manner. Some PCRFs are regionalized and some serve a fixed (configured) set of subscribers. The PCRF servers 114 can aggregate information to and from telecommunications network 100, operational supports systems, and other sources in real time, which can be useful for the creation of rules and automatically making policy decisions for each user active on telecommunications network 100.

Using the PCRF servers 114, telecommunications network 100 can offer multiple services, QoS levels, and charging rules. The PCRF servers 114 can efficiently and dynamically route and prioritize network traffic. The PCRF servers 114 can provide a unified view of user context based on one or more of device, network, location, and billing data. The PCRF servers 114 can provide key inputs to revenue assurance and bandwidth management.

PCA 106 maintains bindings using a subscriber binding repository (SBR) 116 including a bindings database 118. SBR 116 can host both session and binding databases can provide a distributed, scalable, and high availability database function to PCA 106 for storing and managing the session data and the subscriber-PCRF binding data. Binding database 118 stores bindings between subscribers and PCRF severs, and a session database 120 stores Diameter session information related to policy sessions.

Policy sessions can be established using multiple Diameter interfaces such as Gx, Gxx, Gx-Prime, Rx and S9. A session can be characterized as binding-capable or binding-dependent, depending on whether or not a binding can be created over it.

Gx, Gxx and S9 interfaces are binding-capable
Rx, Rx over S9, and Gx-Prime interfaces are binding-dependent A session over a binding-capable interface will be eligible to establish a binding to a PCRF server, while a session over a binding-dependent interface will rely on an existing binding to a PCRF server but cannot typically create a new binding by itself.

In order for PCA 106 to route all messages from a subscriber (perhaps through multiple interfaces and devices) to the same PCRF server, PCA 106 is typically configured to identify the subscriber by the information in the incoming Diameter request messages. One subscriber can be associated with multiple subscriber identifiers depending on the access networks and device types used. The subscriber identifiers can be calling subscriber keys or keys.

Messages that can cause creation of a subscriber-PCRF binding can contain the subscriber's device international mobile subscriber identity (IMSI), which can be used to uniquely identify the subscriber. IMSI can be used as the subscriber anchor key in binding database 118.

Session initiating messages may also contain additional information to identify the subscriber. This information, which may include a Mobile Station Integrated Services Digital Network (MSISDN) number, an IPv4 address, or an IPv6 address prefix, is referred to as subscriber alternate keys. Database records with alternate keys are established by binding-capable sessions and can be used to identify the subscriber in binding-dependent sessions.

For example, a Gx CCR-I message contains the IMSI anchor key under normal circumstances and may also contain an MSISDN, an IPv4 address, and an IPv6 address. After a binding is established between the subscriber and a PCRF, binding-dependent sessions containing one or more of the subscriber keys can be routed to the PCRF using an alternate key.

Binding cleanup tool 104 is configured to detect and manage suspect subscriber bindings by determining that messages destined to a subscriber's bound PCRF server have failed according to one or more user-configurable rules defining failure, e.g., by failing to elicit a response from the PCRF server. When binding cleanup tool 104 determines that the messages have failed, binding cleanup tool 104 causes DSR 102 to tear down that binding. A new binding will be created for the subscriber to a new PCRF server when the next binding capable message is received by DSR 102. If the subscriber has lost service due to the message failures, the subscriber can reacquire service using the new PCRF server.

Binding cleanup tool 104 can be configured with the user-configurable rules by any appropriate technique for establishing user-configurable rules, e.g., by virtue of loading a file containing the rules, by virtue of a machine-tomachine interface (MMI), or by virtue of providing, to a user device, a graphical user interface (GUI) configured to receive the user-configurable rules from a system administrator. Since the rules are user-configurable, a network operator can configure binding cleanup tool 104 to respond appropriately to a particular network configuration.

For example, a system administrator may determine that PCRF servers from a certain vendor experience brief failures frequently but only need to have bindings removed after longer failures. In that case, the system administrator may supply user-configurable rules that cause binding cleanup tool 104 to only determine that messages have failed after a longer period of time has passed from a message delivery error. The longer period of time would ordinarily e shorted than the expected recovery time of re-binding a subscriber. Such user-configurable rules may prevent frequent tearing down of bindings in reaction to the short term failures.

In another example, the system administrator may determine that PCRF servers from a different vendor do not often fail but, when they do, typically they do not recover over a longer period of time. In that case, the system administrator may supply user-configurable rules that cause binding cleanup tool 104 to determine that messages have failed after a shorter period of time has passed from a message delivery error. Such user-configurable rules may allow for very quick detection of PCRF server failures and therefore faster recovery from a loss of service.

The user-configurable rules can take any appropriate form for specifying a failure of messages to a PCRF server. In some examples, determining that messages destined to a PCRF server have failed includes matching a vendor identifier for a vendor of the PCRF server to a vendor-ID rule. In some examples, determining that messages destined to a PCRF server have failed includes counting a number of unsuccessful attempts, e.g., by DSR 102, to route a message to the PCRF server and determining that the number of unsuccessful attempts exceeds a threshold.

In some examples, the user-configurable rules define a number of suspect binding events. A suspect binding event can be any appropriate event indicating that messages may not be being processed correctly by a PCRF server, e.g., because the PCRF server or a component routing messages to the PCRF server has failed. When binding cleanup tool 104 determines that a suspect binding event has occurred, e.g., by receiving a certain message or by not receiving a response message within a specified amount of time, binding cleanup tool 104 can mark the binding as suspect without beginning the process of tearing down the binding. This can be useful, e.g., so that the PCRF server at issue has some time to recover from a minor problem before binding cleanup tool 104 causes DSR 102 to tear down the binding.

When binding cleanup tool 104 determines that a certain number of suspect binding events have occurred for a giving binding, or the suspect binding vents fit a certain pattern such as occurring with a certain time interval, binding cleanup tool 104 can determine that the suspect binding has in fact failed and begin the process of tearing down the binding and creating a new binding. In some examples, determining that messages destined to a PCRF server have failed includes ignoring a suspect binding event, e.g., ignoring a suspect binding event in response to determining that the suspect binding event was received before a user-configurable suspect binding events interval had passed since a previous suspect binding removal event that was not ignored. This can be useful, e.g., so that binding cleanup tool 104 can ignore a "noisy" PCRF server that reports many errors before tearing down a binding is appropriate (e.g., because tearing down the binding will use more time and computing resources than waiting for the PCRF server to recover on its own).

In some examples, binding cleanup tool 104 tears down all subscriber bindings to the failed PCRF for all subscribers bound to the failed PCRF. Binding cleanup tool 104 can tear down all binding for an affected subscriber bound to a failed PCRF, regardless of the APN. In some cases, cleanup is asynchronous. For example, cleanup can operate by sending RARs to PCEF(s), which in turn causes the PCEF(s) to send CCR-T(s), which in turn removes sessions, removes alternate keys, and removes bindings.

FIGS. 2A-D illustrate an example graphical user interface (GUI) for providing user-configurable rules defining failure of messages to a PCRF server. The GUI can be displayed on the display screen of a user device.

Figure 2A:
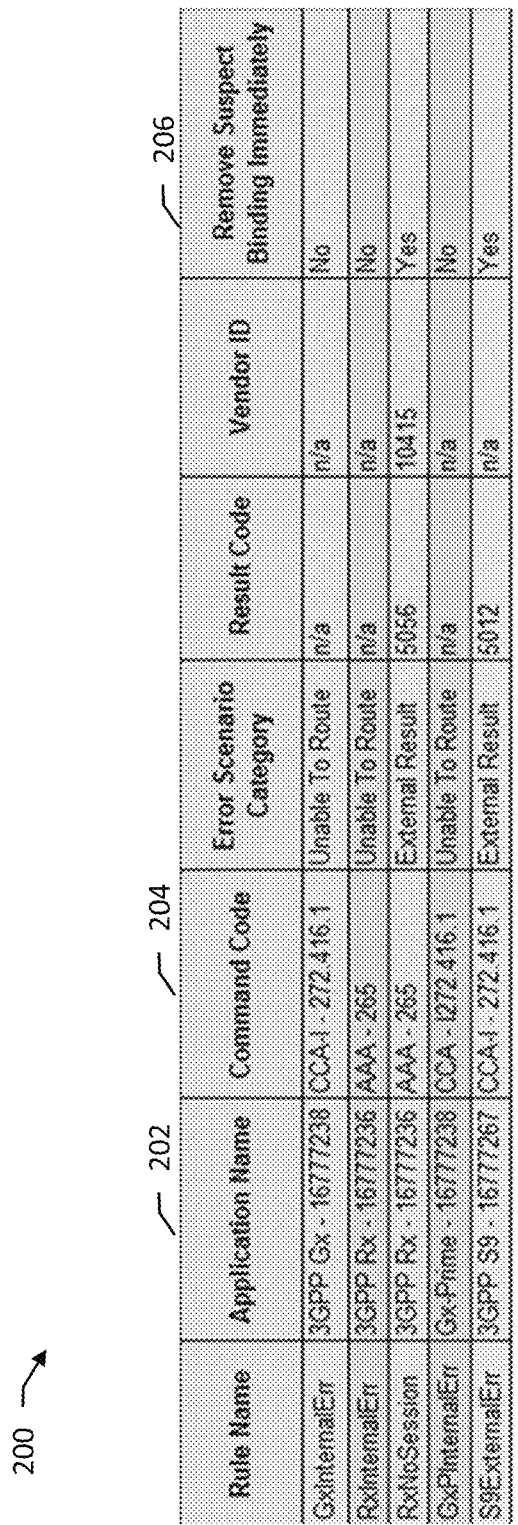

FIG. 2A shows a first view 200 of the example GUI that depicts a table of user-configurable rules for suspect binding removal. The table contains the list of suspect binding removal rules which, when matched, determine if bindings should be considered suspect or removed immediately.

The rows in the table correspond to the rules and the columns of the table correspond to the attributes associated with the rules. The attributes define when a rule is triggered and the consequences of triggering a rule. For example, a rule may be triggered when an event matching the application name 202 and the command code 204 attributes of one of the rules is detected, and the consequence may be to remove the suspect binding immediately or to increment a counter or take other actions depending on the "remove suspect binding immediately" attribute 206.

In some examples, if the "remove suspect binding immediately" attribute 206 is set to yes, a single match on the corresponding rule will cause a Session Release re-authorization request (RAR) to be sent requesting removal of all sessions for the IMSI and PCRF server associated with the event. If set to no, a rule match causes all session for the IMSI and PCRF server to be considered suspect and the number of matches that cause the binding to be removed is configured in the "suspect binding removal events threshold" field shown in FIG. 2B.

FIG. 2B shows a second view 210 of the example GUI that depicts a user interface for inserting a suspect binding removal rule. The rows in FIG. 2B correspond to the attributes of the rule, and the columns give the field names and the values of the attributes.

The first attribute 212 is the rule name. The rule name is a name that uniquely identifies the suspect binding removal rule; it can be a 32-character string, for example. The second attribute 214 is the application name. The application name is the Diameter application name and ID to which this suspect binding removal rule applies. Session initiation answer messages including this Application-Id are candidates to match this rule.

The third attribute 216 is a command code. The command code is the Diameter Command Code or Extended Command Code name and value to which this Suspect Binding Removal Rule applies. Session initiation answer messages including this command code are candidates to match this rule.

The fourth attribute 218 is an error scenario category code, which is the error category to which the suspect binding removal rule applies. Category "unable to route" is for when no session initiation answer is received from the PCRF (possibly because the request could not be routed). If "unable to route" is chosen, the result code sent to the client should be configured, e.g., for the specific interface. Category "external result" is for when a specified session initiation error answer is received from the PCRF. If "external results" is chosen, a result code should be specified, otherwise no result code is necessary.

The fifth attribute 220 is a result code, which is the error answer result code to which this suspect binding removal rule applies if the error scenario category is "external result." This field is not applicable when the error scenario category is set to "unable to route."

The sixth attribute 222 is a Vendor ID. This field can be used to specify a particular vendor of the PCRF. The suspect binding removal rule applies if the vendor of a particular PCRF server matches the vendor ID in this field.

The seventh attribute 224 is the "remove suspect binding immediately" attribute. If this attribute is set to yes, then a single occurrence of an event matching this rule means that the binding should be removed. If the attribute is set to no, then multiple occurrences of events matching the rule need to happen before the binding should be removed. The number of occurrences can be configured separately. The eight attribute 226 is a blank field for an optional comment to describe the suspect binding removal rule.

In summary, a suspect binding event will be ignored if it is received before the configured suspect binding removal events interval has passed since the previous event that was not ignored. The suspect binding event count will be reset to one if it is received after the suspect binding removal events reset has passed since the previous suspect binding removal event. When suspect bindings are removed, the bindings are initially marked as "pending delete." "Pending delete" bindings can be overridden by new binding data if needed. A session integrity service will be triggered to start the removal of the binding capable sessions via Diameter messaging. The binding data will be removed, including alternate key bindings, via Diameter messaging.

The session integrity service, which can be implemented on session SBRs, generates new "release" RAR messages for removed suspect bindings. The service can also support the generation of "query" RARs from the session SBR audit. New "Release" RAR Diameter messages are generated and sent to the PCEFs that initiated the binding capable sessions that created the suspect bindings. The release RAR messages will cause the PCEF to send CCR-T messages. CCR-T messages will remove all session data, and binding data including all bindings for IMSI & APN, IPv4, IPv6, and MSISDN & APN keys. If the CCR-T is not sent by the PCEF, the DSR will eventually remove the binding data and keys.

Figure 2C:
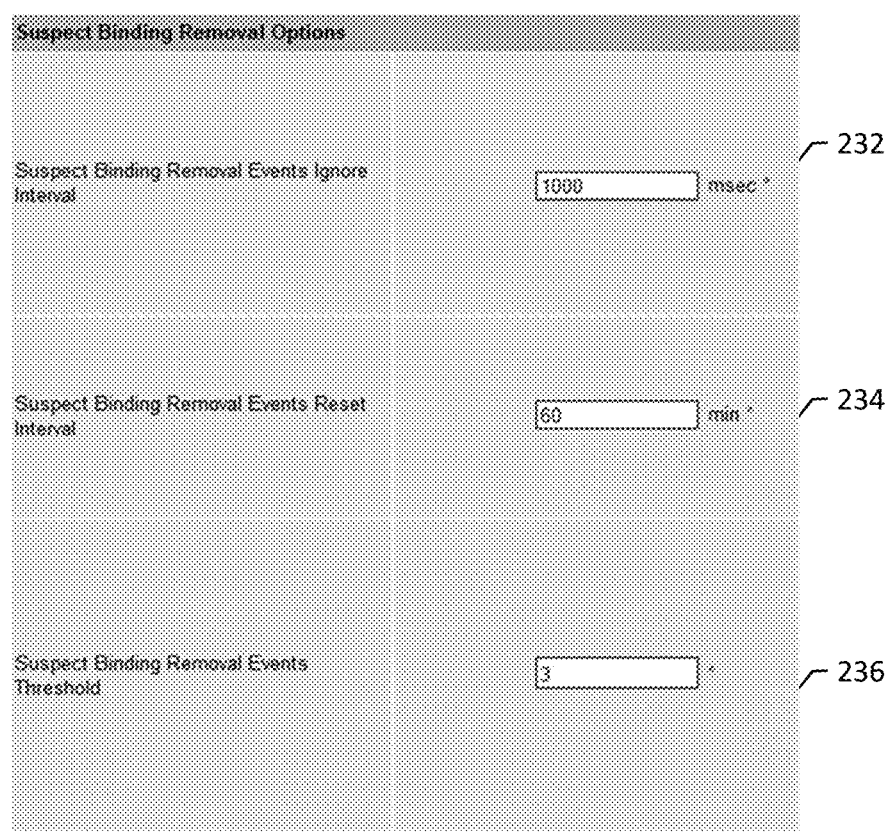

FIG. 2C shows a third view 230 of the example GUI that depicts a user interface for specifying a first set of network-wide suspect binding removal options.

The first row 232 provides an option to specify a suspect binding removal events ignore interval. This value can be used to ignore suspect binding removal events that arrive in quick succession. If a suspect binding removal event arrives for a given binding, but the time interval specified as the suspect binding removal events ignore interval has not yet elapsed, the event will not be counted against the suspect binding removal events threshold. Setting the value to zero means that no events are ignored. It can be useful in some cases to select a value such that retransmissions are ignored.

The second row 234 provides an option to specify a suspect binding removal events reset interval. This value can be used to separate occurrences of PCRF unavailability. The interval is started at the time when the last suspect binding event is counted. If no subsequent suspect binding event occurs after this interval, the suspect binding event count is reset and the suspect binding associated with the count is no longer considered as suspect until the next suspect binding event occurs.

The third row 236 provides an option to specify a suspect binding removal events threshold. This value can be used to avoid triggering suspect binding removal for transient events (e.g., Diameter timeouts). This value specifies the number of suspect binding removal events that must occur for a given binding before the system will attempt to remove the binding by initiating a Session-Release RAR towards the policy client. This value is used when the "remove suspect binding immediately" value is set to no.

Figure 2D:
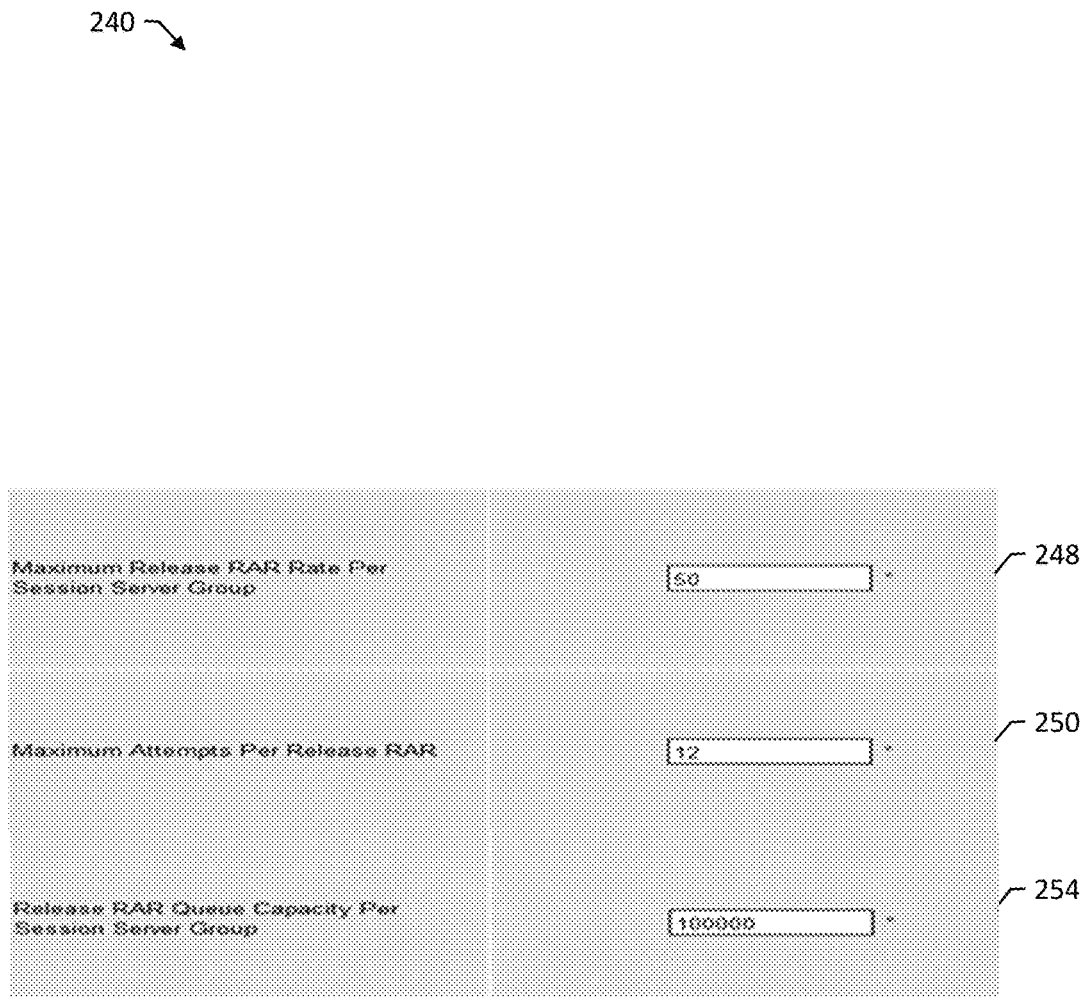

FIG. 2D shows a fourth view 240 of the example GUI that depicts a user interface for specifying a second set of network-wide suspect binding removal options related to session integrity.

The first row 248 provides an option to specify a maximum release RAR rate per session server group value. This value specifies the maximum rate in message per second at which a given session SBR server group can send RAR messages to policy clients for the purpose of requesting removal of a session. Session removal is requested if a session or its associated binding keys cannot be successfully stored in the SBR database, or when a suspect binding is to be removed due to PCRF inaccessibility.

The second row 250 provides an option to specify a maximum attempts per release RAR value. This value specifies the maximum number of times a given RAR will be attempted to be sent to the policy client for purposes of requesting removal of a session when no response is received. If no response is received after the specified number of attempts, the Diameter session and associated binding keys are removed automatically.

The third row 254 provides an option to specify a release RAR queue capacity per session server group value. This value specifies the maximum number of RARs that can be queued in a given session SBR server group for sending to policy clients for the purpose of requesting removal of sessions. If a release RAR cannot be queued because the pending release RAR capacity per session server group has been reached, another attempt to queue the release RAR will occur the next time a suspect binding removal event occurs for that binding.

FIGS. 3A-H are message flow diagrams illustrating example messages exchanged in detecting and managing suspect subscriber bindings. The messages are exchanged between a policy and charging enforcement function (PCEF) 302, a policy Diameter routing application (P-DRA 304, which performs the function of PCA 106), a binding session binding repository (SBR) 306 for IMSI and access point name (APN) data, a session SBR 308 for sessionIDs, a binding SBR 310 for IPv4 data, a binding SBR 312 for IPv6 data, a binding SBR 314 for MSISDN and APN data, and a PCRF 316.

Figure 3A:
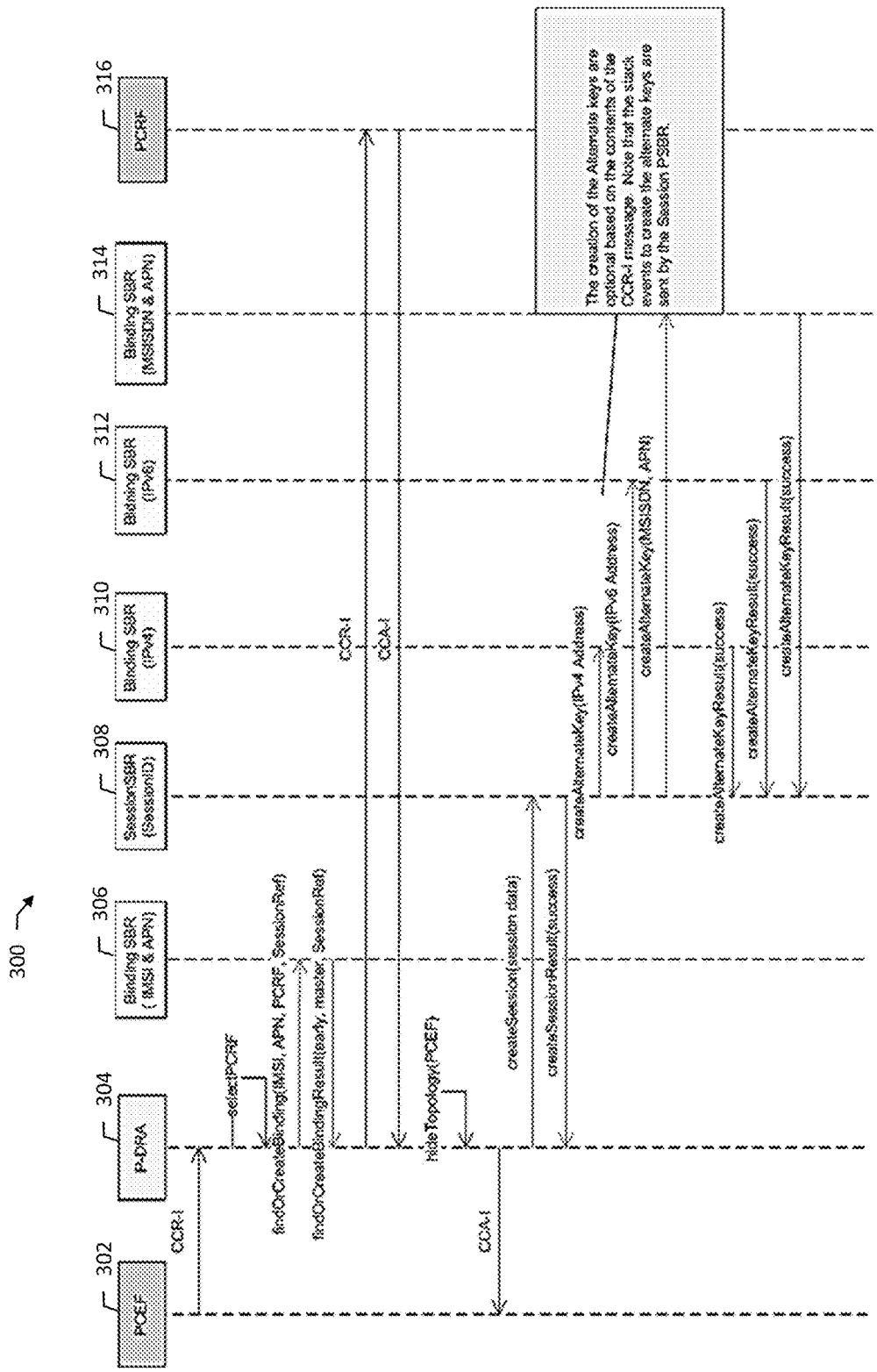
FIGS. 3A-H are message flow diagrams illustrating messages exchanged in detecting and managing suspect subscriber bindings.

FIG. 3A is a message flow diagram 300 illustrating an example binding creation. In the example, PCEF 302 initiates the message flow by sending a CCR-I message to P-DRA 304, which then selects a PCRF and exchanges messages with SBR 306 to determine that no binding currently exists for the subscriber. P-DRA 304 sends a CCR-I message to PCRF 316 and receives a CCA-I message from PCRF 316, and then sends a CCA-I message back to PCEF 302 after optionally performing topology hiding. P-DRA 304 then exchanges message with sessionSBR 308 to create a session, and session SBR 308 optionally exchanges messages with SBRS 310, 312 and 314 to create alternate keys. The creation of alternate keys are optional based on the contents of the CCR-I message.

Table 1 illustrates an example ImsiApnAnchorKey table before binding creation, and Table 2 illustrates the example ImsiApnAnchorKey table after binding creation. The ImsiApnAnchorKey table may have more or fewer columns that those illustrated; for example, the table can include a session number for each row so that each row has a unique session number value.

TABLE 1

ImsiApnAnchorKey Table Before Binding Creation

| IMSI | APN | Bound PCRF | Suspect Binding State | Suspect Event Count | Last Suspect Event Time |
|---|---|---|---|---|---|
| | | | | | |

TABLE 2

ImsiApnAnchorKey Table After Binding Creation

| IMSI | APN | Bound PCRF | Suspect Binding State | Suspect Event Count | Last Suspect Event Time |
|---|---|---|---|---|---|
| 12345 | TestApn | PCRF1 | Not Suspect | 0 | |

Figure 3B:
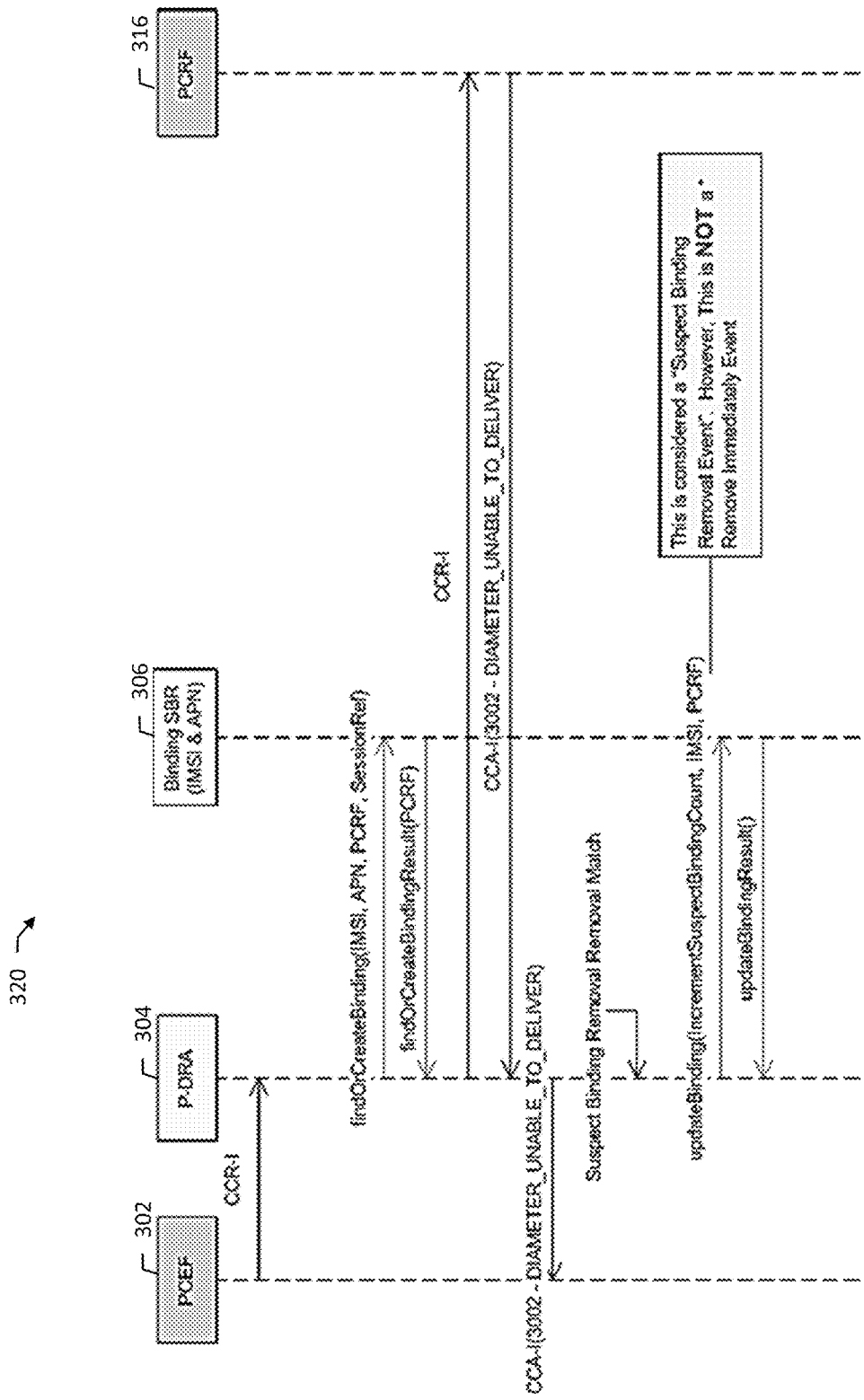

FIG. 3B is a message flow diagram 320 illustrating an example event triggering a binding removal rule on the Gx interface that results in incrementing a count of suspect binding events. P-DRA 304 sends a CCR-I message to PCRF 316 and receives a CCA-I message indicating that the message was undeliverable, which matches a suspect binding removal rule for a suspect binding removal event. The event, however, is not a "remove immediately" event and instead results in incrementing a count of suspect binding removal events for the binding. Tables 3 and 4 illustrate the example ImsiAnchorKey table before and after the suspect binding removal rule is triggered.

TABLE 3

ImsiApnAnchorKey Table Before Binding Creation

| IMSI | APN | Bound PCRF | Suspect Binding State | Suspect Event Count | Last Suspect Event Time |
|---|---|---|---|---|---|
| 12345 | TestApn | PCRF1 | Not Suspect | 0 | |
| 12345 | TestApn | PCRF1 | Not Suspect | 1 | |

TABLE 4

ImsiApnAnchorKey Table After Binding Creation

| IMSI | APN | Bound PCRF | Suspect Binding State | Suspect Event Count | Last Suspect Event Time |
|---|---|---|---|---|---|
| 12345 | TestApn | PCRF1 | Not Suspect | 2 | 1/20/2015 12:00:00:00 |
| 12345 | TestApn | PCRF1 | Not Suspect | 2 | 1/20/2015 12:00:00:00 |

Figure 3C:
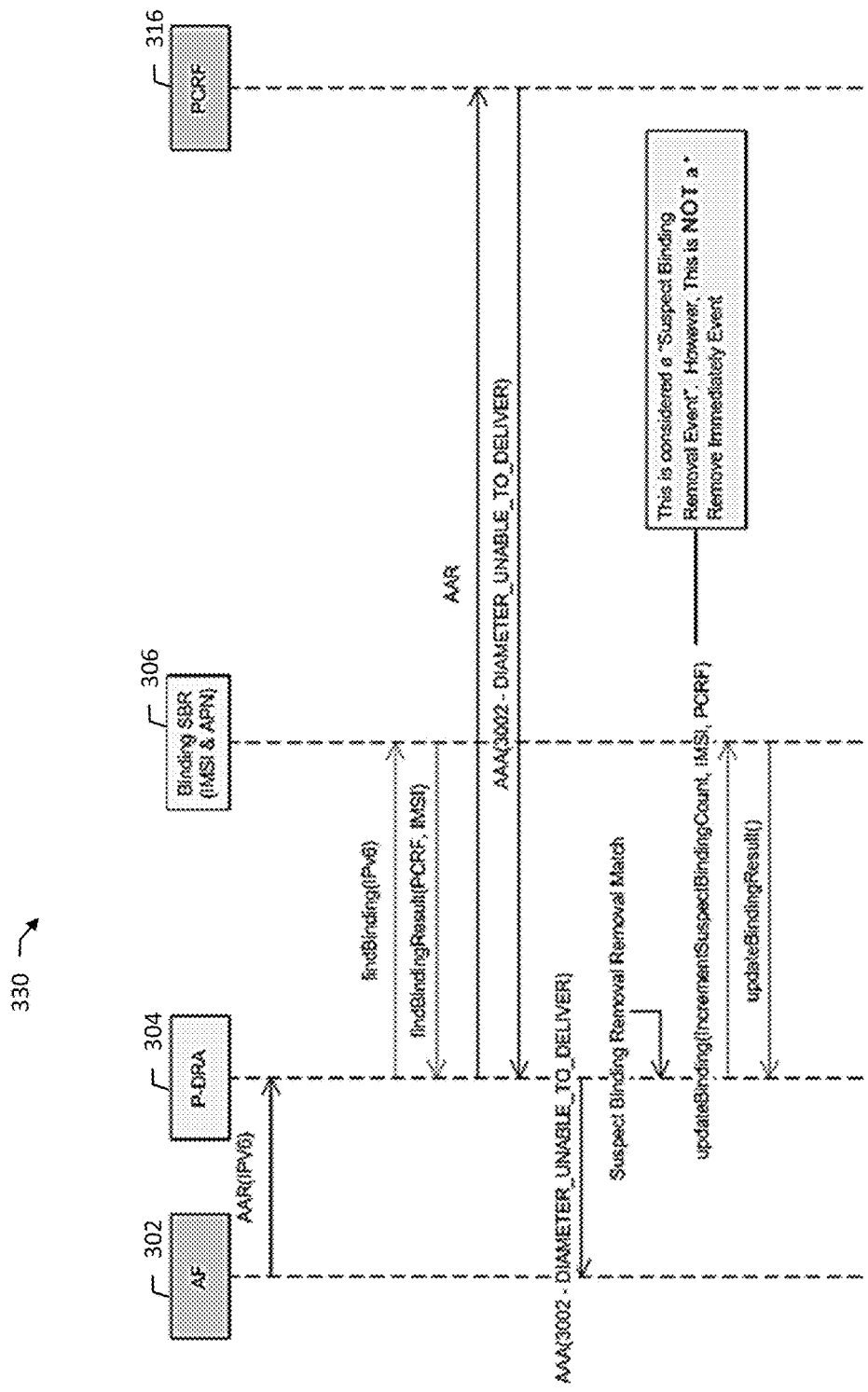

FIG. 3C is a message flow diagram 330 illustrating an example event triggering a binding removal rule on the Rx interface that results in incrementing a count of suspect binding events. P-DRA 304 sends an AAR message to PCRF 316 and receives a AAA message indicating that the message was undeliverable, which matches a suspect binding removal rule for a suspect binding removal event. The event, however, is not a "remove immediately" event and instead results in incrementing a count of suspect binding removal events for the binding. Tables 5 and 6 illustrate the example ImsiAnchorKey table before and after the suspect binding removal rule is triggered.

TABLE 5

ImsiApnAnchorKey Table Before Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Not Suspect | 0 | |
| 12345 | TestApn | PCRF1 | Not Suspect | 1 | |

TABLE 6

ImsiApnAnchorKey Table After Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Not Suspect | 1 | 1/20/2015 12:00:00:00 |
| 12345 | TestApn | PCRF1 | Not Suspect | 2 | 1/20/2015 12:00:00:00 |

Figure 3D:
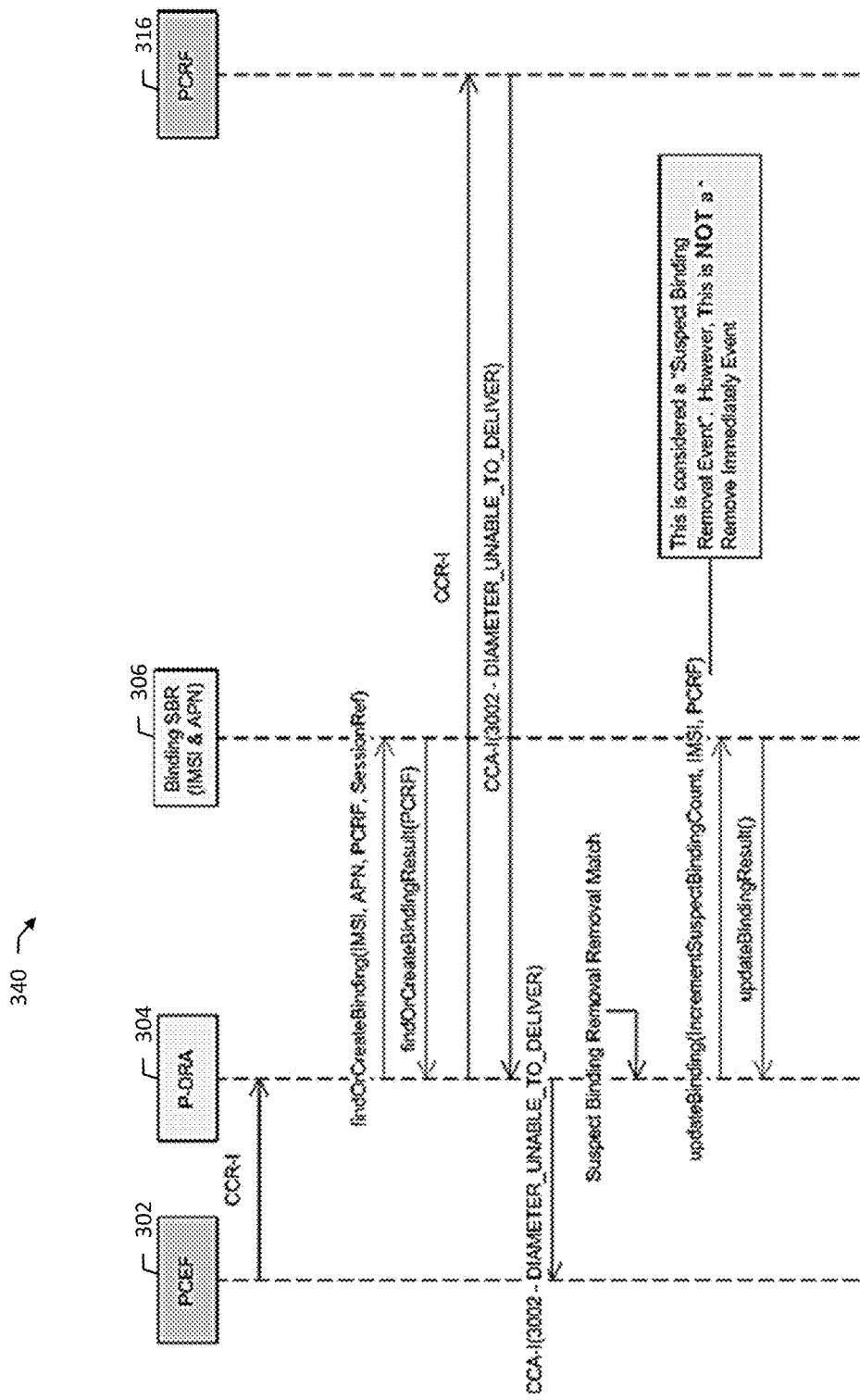

FIG. 3D is a message flow diagram 340 illustrating an example event triggering a binding removal rule that is ignored. P-DRA 304 sends a CCR-I message to PCRF 316 and receives a CCA-I message indicating that the message was undeliverable, which matches a suspect binding removal rule for a suspect binding removal event. The event, however, is detected within the suspect binding event ignore interval, so the count is not incremented. For example, if the suspect binding event ignore interval is set to 1000 ms, and the event is detected within 50 ms of a previous event, then the event is ignored by not incrementing the count. Tables 7 and 8 illustrate the example ImsiAnchorKey table before and after the suspect binding removal rule is triggered.

TABLE 7

ImsiApnAnchorKey Table Before Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Not Suspect | 1 | 1/20/2015 12:00:00:00 |
| 12345 | TestApn | PCRF1 | Not Suspect | 2 | 1/20/2015 12:00:00:00 |

TABLE 8

ImsiApnAnchorKey Table After Suspect Event Ignored

| IMSI | APN | Bound PCRF | Suspect Binding State | Suspect Event Count | Last Suspect Event Time |
|---|---|---|---|---|---|
| 12345 | TestApn | PCRF1 | Not Suspect | 1 | 1/20/2015 12:00:00:00 |
| 12345 | TestApn | PCRF1 | Not Suspect | 2 | 1/20/2015 12:00:00:00 |

Figure 3E:
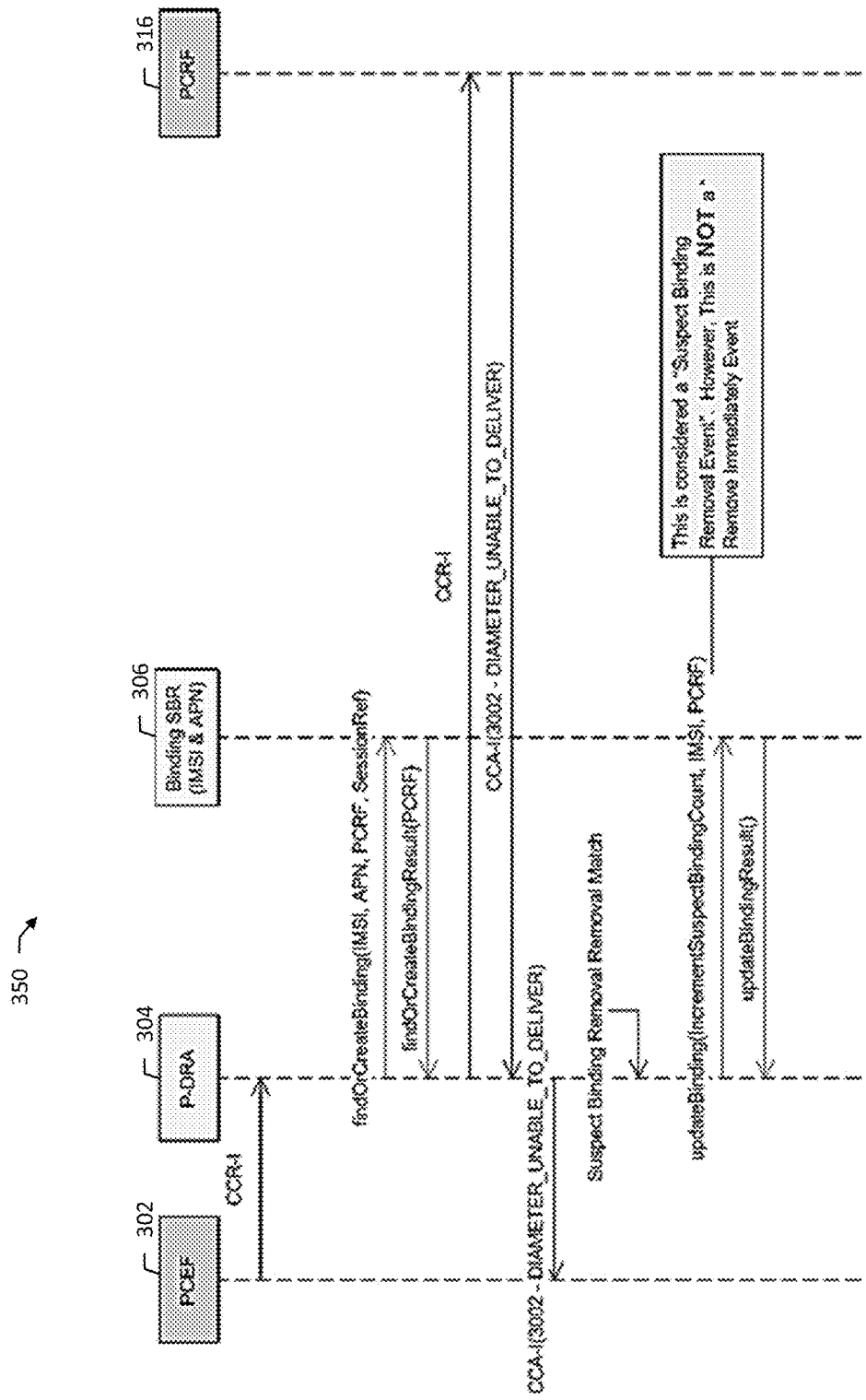

FIG. 3E is a message flow diagram 350 illustrating an example event triggering a binding removal rule in a reset interval. P-DRA 304 sends a CCR-I message to PCRF 316 and receives a CCA-I message indicating that the message was undeliverable, which matches a suspect binding removal rule for a suspect binding removal event. The event, however, is detected after the suspect binding event reset interval has passed, so the count is reset to one. For example, if the suspect binding event reset interval is set to 60 minutes, and the event is detected after 70 minutes have passed since a previous event, then the count is reset to one. Tables 9 and 10 illustrate the example ImsiAnchorKey table before and after the suspect binding removal rule is triggered.

TABLE 9

ImsiApnAnchorKey Table Before Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Not Suspect | 3 | 1/20/2015 12:00:00:00 |
| 12345 | TestApn | PCRF1 | Not Suspect | 2 | 1/20/2015 12:00:00:00 |

TABLE 10

ImsiApnAnchorKey Table After Reset

| IMSI | APN | Bound PCRF | Suspect Binding State | Suspect Event Count | Last Suspect Event Time |
|---|---|---|---|---|---|
| 12345 | TestApn | PCRF1 | Not Suspect | 1 | 1/20/2015 12:00:00:00 |
| 12345 | TestApn | PCRF1 | Not Suspect | 1 | 1/20/2015 12:00:00:00 |

Figure 3F:
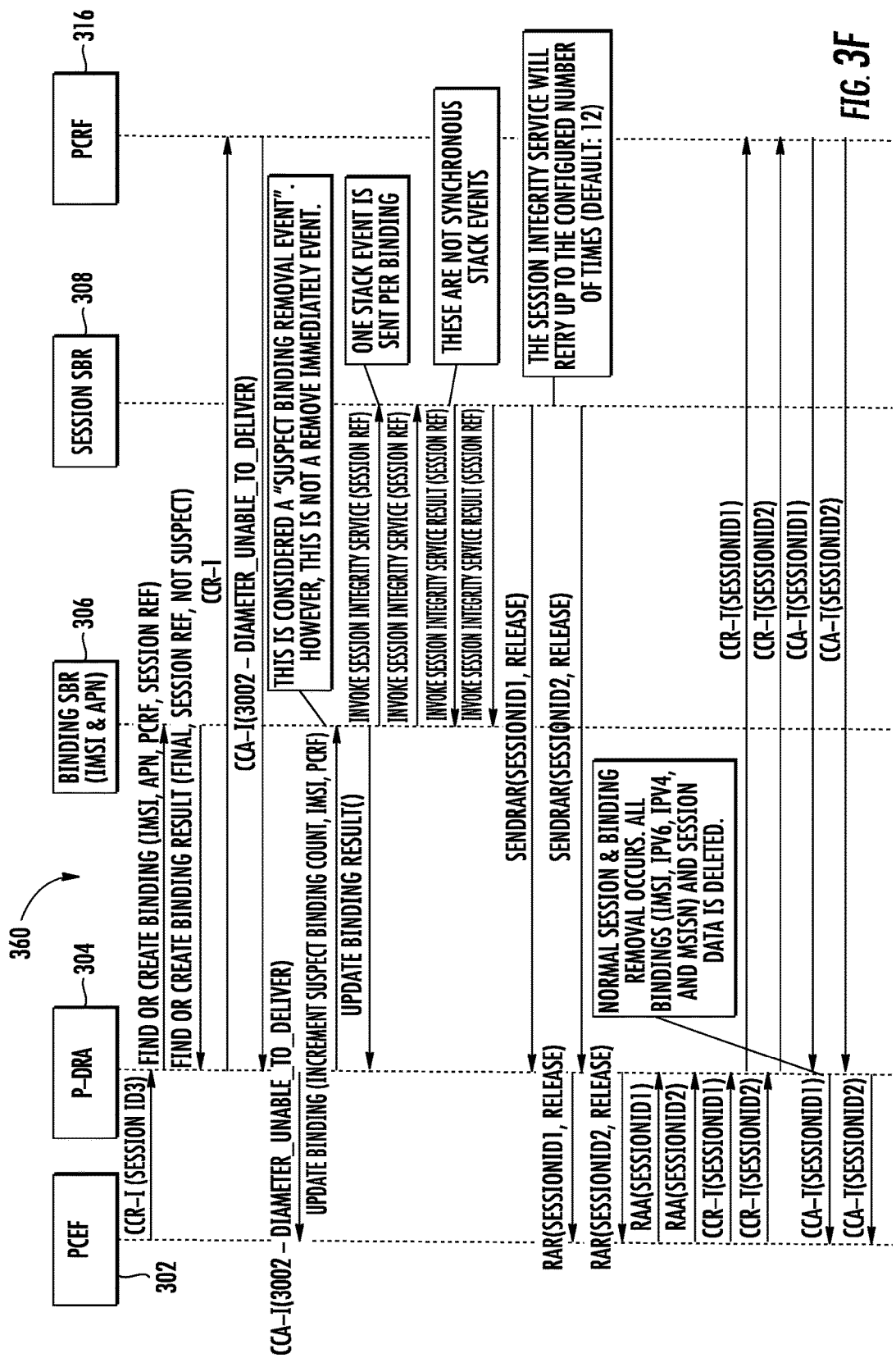

FIG. 3F is a message flow diagram 360 illustrating an example event triggering a binding removal rule causing a count threshold to be exceeded. P-DRA 304 sends a CCR-I message to PCRF 316 and receives a CCA-I message indicating that the message was undeliverable, which matches a suspect binding removal rule for a suspect binding removal event. The event causes the count to be incremented which causes the count to exceed the suspect binding removal rule events threshold. For example, if the suspect binding removal rule events threshold is set to three, and the event causes the count to be incremented to four, then the binding will be torn down so that a new binding will be created on the next receipt by the DSR of a binding capable message for the subscriber. In another example, the binding can be torn down in response to threshold being met or exceeded, e.g., when the count reaches three. Tables 11-13 illustrate the example ImsiAnchorKey table before the event, after the event when the bindings are marked as pending delete, and then after the delete.

TABLE 11

ImsiApnAnchorKey Table Before Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Not Suspect | 3 | 1/20/2015 12:00:00:00 |
| 12345 | TestApn | PCRF1 | Not Suspect | 2 | 1/20/2015 12:00:00:00 |

TABLE 12

ImsiApnAnchorKey Table After Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Pending Delete | 4 | 1/20/2015 12:00:00:00 |
| 12345 | TestApn | PCRF1 | Pending Delete | 3 | 1/20/2015 12:00:00:00 |

TABLE 13

ImsiApnAnchorKey Table After Deletion

| IMSI | APN | Bound PCRF | Suspect Binding State | Suspect Event Count | Last Suspect Event Time |
|---|---|---|---|---|---|

Figure 3G:
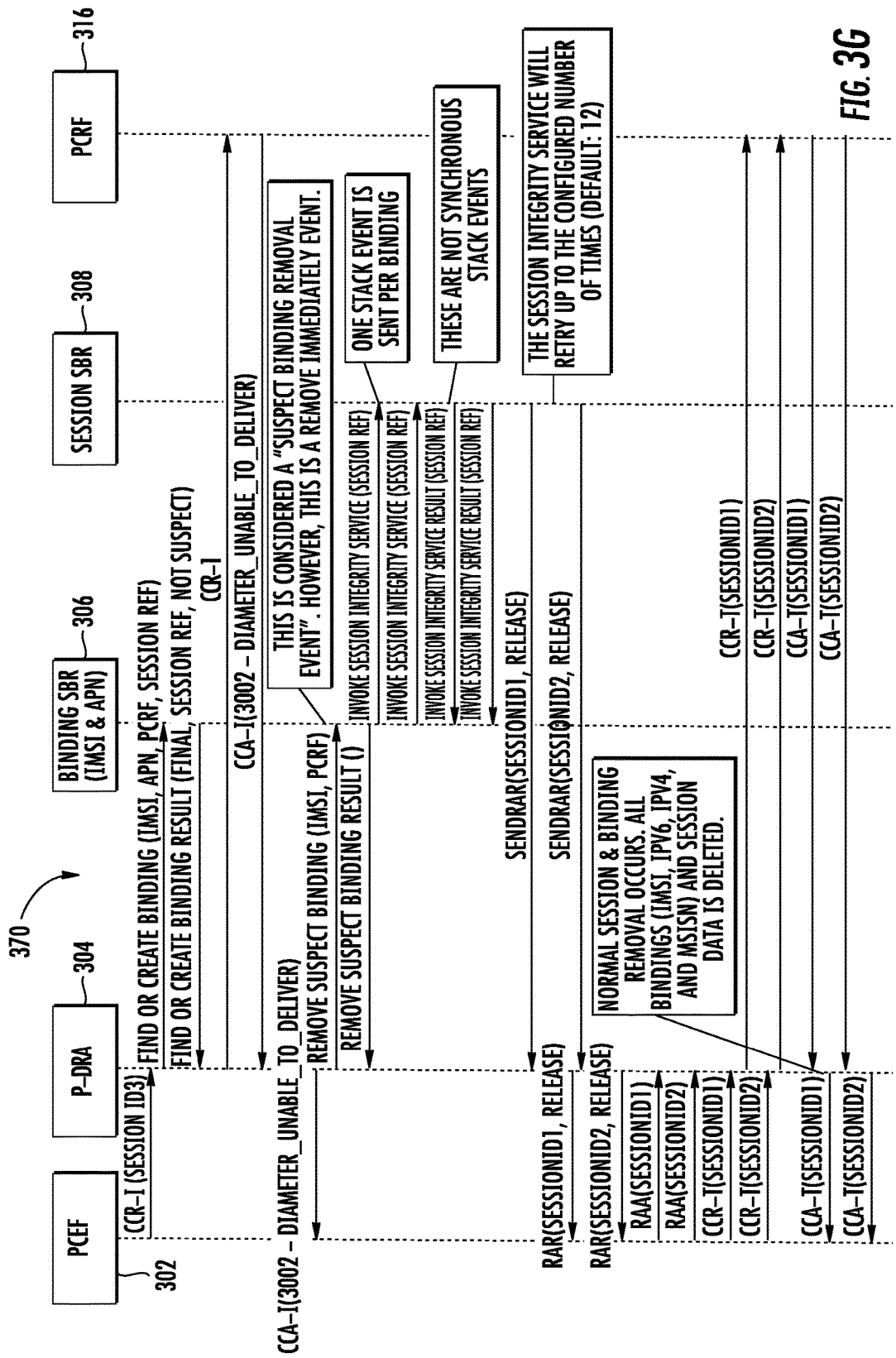

FIG. 3G is a message flow diagram 370 illustrating an example event triggering a binding removal rule causing an immediate removal. P-DRA 304 sends a CCR-I message to PCRF 316 and receives a CCA-I message indicating that the message was undeliverable, which matches a suspect binding removal rule for a suspect binding removal event. The event causes an immediate removal of the suspect binding. Tables 14-16 illustrate the example ImsiAnchorKey table before the event, after the event when the bindings are marked as pending delete, and then after the delete.

TABLE 14

ImsiApnAnchorKey Table Before Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Not Suspect | 1 | 1/20/2015 12:00:00:00 |
| 12345 | TestApn | PCRF1 | Not Suspect | 1 | 1/20/2015 12:00:00:00 |

TABLE 15

ImsiApnAnchorKey Table After Suspect Event Detected

| IMSI | APN | Bound PCRF | Suspect Binding State | Suspect Event Count | Last Suspect Event Time |
|---|---|---|---|---|---|
| 12345 | TestApn | PCRF1 | Pending Delete | 1 | 1/20/2015 12:00:00:00 |
| 12345 | TestApn | PCRF1 | Pending Delete | 1 | 1/20/2015 12:00:00:00 |

TABLE 16

ImslApnAnchorKey Table Before After Deletion

| IMSI | APN | Bound PCRF | Suspect Binding State | Suspect Event Count | Last Suspect Event Time |
|---|---|---|---|---|---|

Figure 3H:
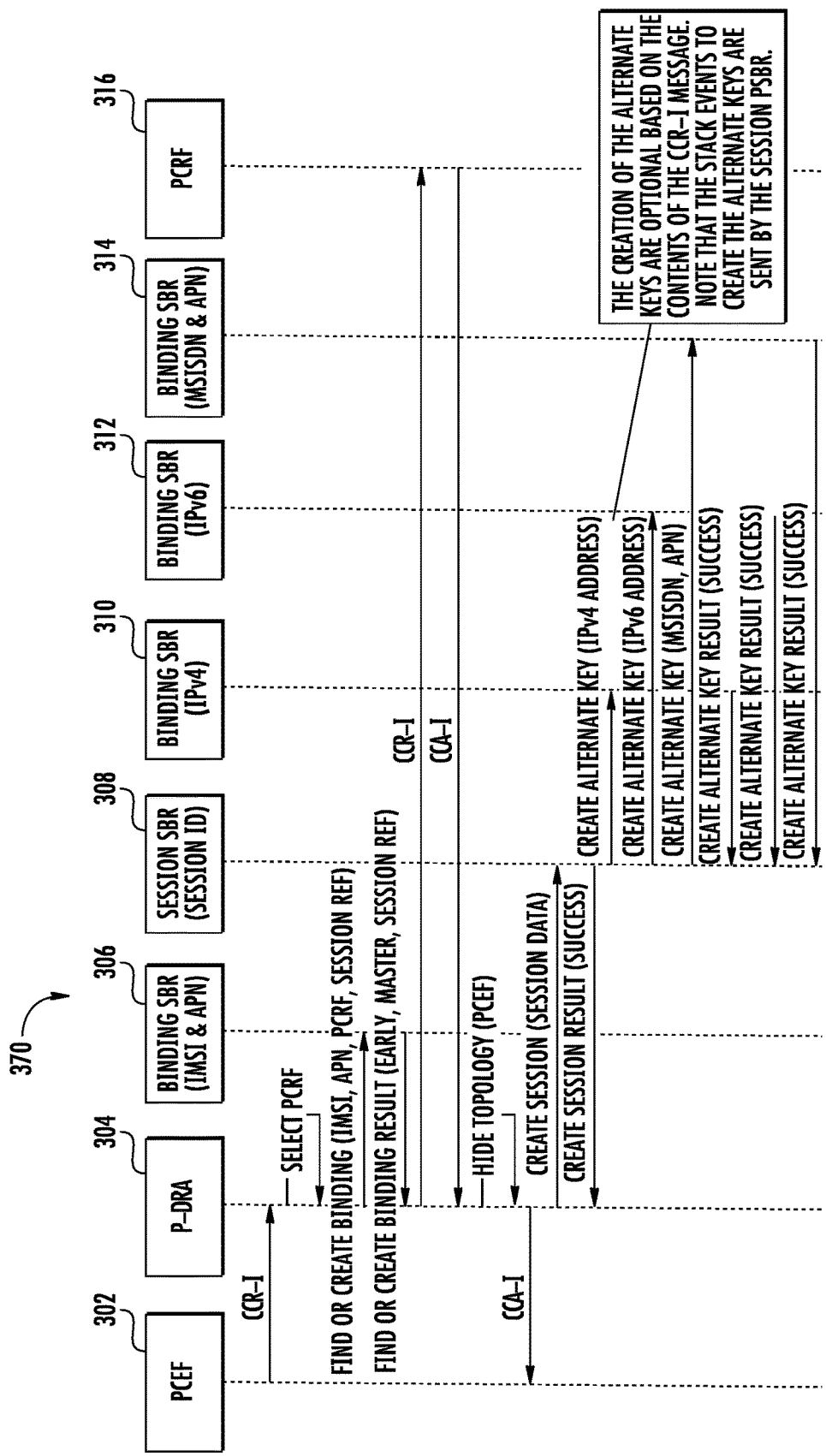

FIG. 3H is a message flow diagram 380 illustrating an example binding creation where the binding is full of pending deletes. P-DRA 304 sends a CCR-I message to PCRF 316 and receives a CCA-I message indicating that the message was undeliverable, which matches a suspect binding removal rule for a suspect binding removal event. The event causes an immediate removal of the suspect binding. The sessions in the example ImsiApnAnchorKey table are, in response, marked as pending delete. A new binding is created to a new PCRF server, PCRF3. Tables 17 and 18 illustrate the example ImsiApnAnchorKey table before and after binding creation.

TABLE 17

ImsiApnAnchorKey Table Before Binding Creation

| IMSI | APN | Bound PCRF | Suspect Binding State | Suspect Event Count | Last Suspect Event Time |
|---|---|---|---|---|---|
| 12345 | TestApn | PCRF1 | Pending Delete | 1 | 1/20/2015 12:00:00:00 |
| 12345 | TestApn | PCRF1 | Pending Delete | 2 | 1/20/2015 11:00:00:00 |
| 12345 | TestApn | PCRF1 | Pending Delete | 1 | 1/20/2015 12:00:00:00 |
| 12345 | TestApn | PCRF1 | Pending Delete | 1 | 1/20/2015 12:00:00:00 |
| 12345 | TestApn | PCRF1 | Pending Delete | 1 | 1/20/2015 12:00:00:00 |
| 12345 | TestApn | PCRF1 | Pending Delete | 2 | 1/20/2015 12:00:00:00 |
| 12345 | TestApn | PCRF1 | Pending Delete | 1 | 1/20/2015 11:00:00:00 |
| 12345 | TestApn | PCRF1 | Pending Delete | 1 | 1/20/2015 12:00:00:00 |
| 12345 | TestApn | PCRF1 | Pending Delete | 2 | 1/20/2015 11:00:00:00 |
| 12345 | TestApn | PCRF1 | Pending Delete | 1 | 1/20/2015 12:00:00:00 |

TABLE 18

ImsiApnAnchorKey Table After Binding Creation

| IMSI | APN | Bound PCRF | Suspect Binding State | Suspect Event Count | Last Suspect Event Time |
|---|---|---|---|---|---|
| 12345 | TestApn | PCRF3 | Not Suspect | 0 | |
| 12345 | TestApn | PCRF1 | Pending Delete | 2 | 1/20/2015 11:00:00:00 |
| 12345 | TestApn | PCRF1 | Pending Delete | 1 | 1/20/2015 12:00:00:00 |
| 12345 | TestApn | PCRF1 | Pending Delete | 1 | 1/20/2015 12:00:00:00 |
| 12345 | TestApn | PCRF1 | Pending Delete | 1 | 1/20/2015 12:00:00:00 |
| 12345 | TestApn | PCRF1 | Pending Delete | 2 | 1/20/2015 12:00:00:00 |
| 12345 | TestApn | PCRF1 | Pending Delete | 1 | 1/20/2015 11:00:00:00 |
| 12345 | TestApn | PCRF1 | Pending Delete | 1 | 1/20/2015 12:00:00:00 |
| 12345 | TestApn | PCRF1 | Pending Delete | 2 | 1/20/2015 11:00:00:00 |
| 12345 | TestApn | PCRF1 | Pending Delete | 1 | 1/20/2015 12:00:00:00 |

Figure 4:
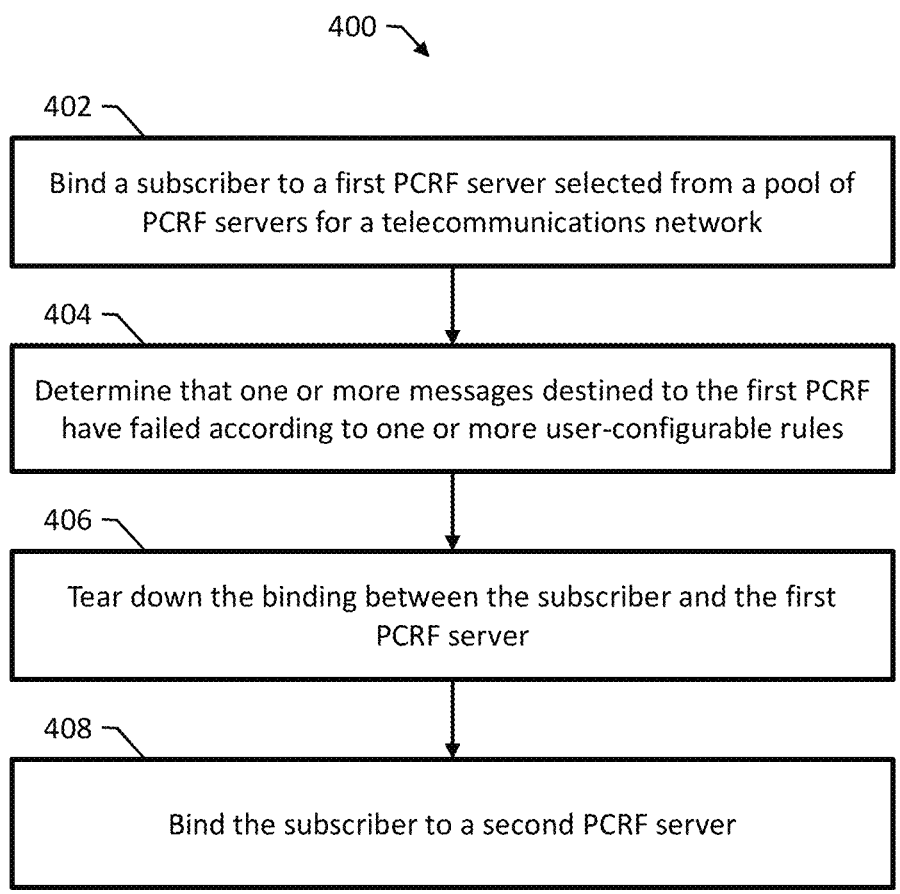
FIG. 4 is a flow diagram of an example method for detecting and managing suspect subscriber bindings in a telecommunications network.

FIG. 4 is a flow diagram of an example method 400 for detecting and managing suspect subscriber bindings in a telecommunications network. The method is performed by a system of one or more computers, e.g., DSR 102 of FIG. 1 executing binding cleanup tool 104 and RCA 106. The system can provide, to a user device, a graphical user interface (GUI) configured to receive user-configurable rules from a user to control method 400.

DSR 102 binds a subscriber to a first PCRF server selected from a pool of PCRF servers for the telecommunications network (402). For example, binding the subscriber to the first PCRF server can include storing an association between a subscriber identifier for the subscriber and the first PCRF in a subscription binding repository (SBR), causing all Diameter messaging for the subscriber to be routed to the first PCRF server. In some examples, binding the subscriber to the first PCRF server includes binding the subscriber to the first PCRF server for a session with a policy and charging enforcement function (PCEF) on a Gx interface. There can be more than one Gx session for the same subscriber. In that case, subsequent Gx sessions for the same subscriber may need to be routed to the same PCRF server as the first session for that subscriber (depending on the APN being used for each session).

In some examples, binding the subscriber to the first PCRF server includes using the binding from the subscriber to the first PCRF server for a session with an application function (AF) on a Rx interface. The binding creates a mapping between subscriber identifiers and, optionally, other alternate keys and PCRF servers. The binding keys, once established as a result of the Gx session, can be used by Rx sessions from devices that may not have access to the subscriber identifiers. So the Rx sessions "use" the binding to route to the PCRF server associated with the subscriber.

The system may not directly notify the AF. Instead, the AF will typically subscribe with the PCRF for notification if the Gx session is torn down. So the AF finds out indirectly that the Gx session was removed, by virtue of the subscription, causing the AF to remove an Rx sessions related to the Gx session.

DSR 102 determines that one or more messages destined to the first PCRF server have failed according to one or more user-configurable rules defining failure (404). For example, determining that one or more messages destined to the first PCRF server have failed can include matching a vendor identifier for a vendor of the first PCRF server to a vendor-ID rule of the one or more user-configurable rules. In some examples, determining that one or more messages destined to the first PCRF server have failed includes counting a number of unsuccessful attempts to route a message to the first PCRF server and determining that the number of unsuccessful attempts exceeds a threshold. In some examples, determining that one or more messages destined to the first PCRF server have failed includes ignoring a suspect binding event in response to determining that the suspect binding event was received before a user-configurable suspect binding removal events interval had passed since a previous suspect binding removal event that was not ignored.

The user-configurable rules can be related to various aspects of communication with a PCRF server. For example, the user-configurable rules can be related to or specify: message type, response code, immediate or threshold value, delay value, maximum number of binding capable sessions threshold, and reset time.

DSR 102 tears down the binding between the subscriber and the first PCRF server (406). The system binds the subscriber to a second PCRF server selected from the plurality of PCRF servers (408). Typically, the system does not automatically bind the subscriber to the second PCRF server. Instead, by tearing down sessions and the binding to the first PCRF server, the system allows a new binding to be established to the second PCRF. For example, the new binding can be established when the PCEF establishes a Gx session with the second PCRF. A new binding can be created even if an old one is still being cleaned up. If the subscriber has lost service due to the messages destined to the first PCRF failing, the subscriber can reacquire service using the second PCRF server.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method performed by a system of one or more computers, the method comprising:
   at a Diameter signaling router (DSR) for a telecommunications network:
      binding a subscriber to a first policy and charging rules function (PCRF) server selected from a plurality of PCRF servers for the telecommunications network;
      determining that one or more messages destined to the first PCRF server have failed according to one or more user-configurable rules defining failure; and
      tearing down the binding between the subscriber and the first PCRF server, wherein tearing down the binding between the subscriber and the first PCRF server comprises deleting one or more alternate key bindings for the subscriber.

2. The method of claim 1, wherein binding the subscriber to the first PCRF server comprises storing an association between one or more subscriber identifiers for the subscriber and the first PCRF in a subscription binding repository (SBR), causing all policy Diameter messaging for the subscriber to be routed to the first PCRF server.

3. The method of claim 1, wherein binding the subscriber to the first PCRF server comprises using the binding from the subscriber to the first PCRF server for a session with an application function (AF) on an Rx interface.

4. The method of claim 1, wherein binding the subscriber to the first PCRF server comprises binding the subscriber to the first PCRF server for a session with a policy and charging enforcement function (PCEF) on a Gx interface.

5. The method of claim 1, comprising providing, to a user device, a graphical user interface (GUI) configured to receive the user-configurable rules defining failure from a user.

6. The method of claim 1, wherein determining that one or more messages destined to the first PCRF server have failed comprises counting a number of unsuccessful attempts to route a message to the first PCRF server and determining that the number of unsuccessful attempts exceeds a user-configurable threshold.

7. A method performed by a system of one or more computers, the method comprising:
   at a Diameter signaling router (DSR) for a telecommunications network:
      binding a subscriber to a first policy and charging rules function (PCRF) server selected from a plurality of PCRF servers for the telecommunications network;
      determining that one or more messages destined to the first PCRF server have failed according to one or more user-configurable rules defining failure; and
      tearing down the binding between the subscriber and the first PCRF server, wherein tearing down the binding between the subscriber and the first PCRF server comprises notifying one or more policy and charging enforcement functions (PCEFs) serving the subscriber that the DSR is tearing down the binding between the subscriber and the first PCRF server.

8. A method performed by a system of one or more computers, the method comprising:
   at a Diameter signaling router (DSR) for a telecommunications network:
      binding a subscriber to a first policy and charging rules function (PCRF) server selected from a plurality of PCRF servers for the telecommunications network;
      determining that one or more messages destined to the first PCRF server have failed according to one or more user-configurable rules defining failure; and
      tearing down the binding between the subscriber and the first PCRF server;
      wherein determining that one or more messages destined to the first PCRF server have failed comprises comparing one or more fields in a failure response from an attempt to route to the first PCRF server with a vendor-ID rule of the one or more user-configurable rules and matching a vendor identifier for a vendor of the first PCRF server to the vendor-ID rule of the one or more user-configurable rules.

9. A method performed by a system of one or more computers, the method comprising:
at a Diameter signaling router (DSR) for a telecommunications network:
binding a subscriber to a first policy and charging rules function (PCRF) server selected from a plurality of PCRF servers for the telecommunications network;
determining that one or more messages destined to the first PCRF server have failed according to one or more user-configurable rules defining failure; and
tearing down the binding between the subscriber and the first PCRF server;
wherein determining that one or more messages destined to the first PCRF server have failed comprises ignoring a suspect binding event in response to determining that the suspect binding event was received before a user-configurable suspect binding removal events interval had passed since a previous suspect binding removal event that was not ignored.

10. A system for detecting and managing suspect subscriber bindings, the system comprising:
a Diameter signaling router (DSR) including at least one processor;
a policy and charging application implemented by the at least one processor for binding a subscriber to a first policy and charging rules function (PCRF) server selected from a plurality of PCRF servers for a telecommunications network; and
a binding cleanup tool implemented by the at least one processor for determining that one or more messages destined to the first PCRF server have failed according to one or more user-configurable rules defining failure and for tearing down the binding between the subscriber and the first PCRF server,
wherein tearing down the binding between the subscriber and the first PCRF server comprises deleting one or more alternate key bindings for the subscriber.

11. The system of claim 10, wherein binding the subscriber to the first PCRF server comprises storing an association between one or more subscriber identifiers for the subscriber and the first PCRF in a subscription binding repository (SBR), causing all policy Diameter messaging for the subscriber to be routed to the first PCRF server.

12. The system of claim 10, wherein binding the subscriber to the first PCRF server comprises using the binding from the subscriber to the first PCRF server for a session with an application function (AF) on an Rx interface.

13. The system of claim 10, wherein binding the subscriber to the first PCRF server comprises binding the subscriber to the first PCRF server for a session with a policy and charging enforcement function (PCEF) on a Gx interface.

14. The system of claim 10, wherein the binding cleanup tool is configured to provide, to a user device, a graphical user interface (GUI) configured to receive the user-configurable rules defining failure from a user.

15. The system of claim 10, wherein determining that one or more messages destined to the first PCRF server have failed comprises counting a number of unsuccessful attempts to route a message to the first PCRF server and determining that the number of unsuccessful attempts exceeds a user-configurable threshold.

16. A system for detecting and managing suspect subscriber bindings, the system comprising:
a Diameter signaling router (DSR) including at least one processor;
a policy and charging application implemented by the at least one processor for binding a subscriber to a first policy and charging rules function (PCRF) server selected from a plurality of PCRF servers for a telecommunications network; and
a binding cleanup tool implemented by the at least one processor for determining that one or more messages destined to the first PCRF server have failed according to one or more user-configurable rules defining failure and for tearing down the binding between the subscriber and the first PCRF server;
wherein tearing down the binding between the subscriber and the first PCRF server comprises notifying one or more policy and charging enforcement functions (PCEFs) serving the subscriber that the DSR is tearing down the binding between the subscriber and the first PCRF server.

17. A system for detecting and managing suspect subscriber bindings, the system comprising:
a Diameter signaling router (DSR) including at least one processor;
a policy and charging application implemented by the at least one processor for binding a subscriber to a first policy and charging rules function (PCRF) server selected from a plurality of PCRF servers for a telecommunications network; and
a binding cleanup tool implemented by the at least one processor for determining that one or more messages destined to the first PCRF server have failed according to one or more user-configurable rules defining failure and for tearing down the binding between the subscriber and the first PCRF server;
wherein determining that one or more messages destined to the first PCRF server have failed comprises comparing one or more fields in a failure response from an attempt to route to the first PCT server with a vendor-ID rule of the one or more user-configurable rules and matching a vendor identifier for a vendor of the first PCRF server to the vendor-ID rule of the one or more user-configurable rules.

18. A system for detecting and managing suspect subscriber bindings, the system comprising:
a Diameter signaling router (DSR) including at least one processor;
a policy and charging application implemented by the at least one processor for binding a subscriber to a first policy and charging rules function (PCRF) server selected from a plurality of PCRF servers for a telecommunications network; and
a binding cleanup tool implemented by the at least one processor for determining that one or more messages destined to the first PCRF server have failed according to one or more user-configurable rules defining failure and for tearing down the binding between the subscriber and the first PCRF server;
wherein determining that one or more messages destined to the first PCRF server have failed comprises ignoring a suspect binding event in response to determining that the suspect binding event was received before a user-configurable suspect binding removal events interval had passed since a previous suspect binding removal event that was not ignored.

19. A non-transitory computer readable medium storing executable instructions that, when executed by one or more computers comprising a Diameter Signaling Router (DSR), cause the one or more computers to perform operations comprising:

binding a subscriber to a first policy and charging rules function (PCRF) server selected from a plurality of PCRF servers for a telecommunications network;

determining that one or more messages destined to the first PCRF server have failed according to one or more user-configurable rules defining failure; and tearing down the binding between the subscriber and the first PCRF server, wherein tearing down the binding between the subscriber and the first PCRF server comprises deleting one or more alternate key bindings for the subscriber.

\* \* \* \* \*

UNITED STATES PATENT AND TRADEMARK OFFICE
CERTIFICATE OF CORRECTION

PATENT NO.      : 10,102,087 B2
APPLICATION NO. : 15/048410
DATED           : October 16, 2018
INVENTOR(S)     : Dreyer et al.

Page 1 of 1

It is certified that error appears in the above-identified patent and that said Letters Patent is hereby corrected as shown below:

On the Title Page

On page 2, Column 2, under Other Publications, Line 20, delete "Product,"" and insert -- Protocol," --, therefor.

In the Specification

In Column 8, Line 65, delete "sessionSBR" and insert -- session SBR --, therefor.

In Column 13, Line 20, delete "ImslApnAnchorKey" and insert -- ImsiApnAnchorKey --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*